United States Patent [19]

Brandt

[11] Patent Number: 5,418,197
[45] Date of Patent: May 23, 1995

[54] SIC WHISKER AND PARTICLE REINFORCED CERAMIC CUTTING TOOL MATERIAL

[75] Inventor: Gunnar Brandt, Solna, Sweden

[73] Assignee: Sandvik AB, Sandviken, Sweden

[21] Appl. No.: 180,341

[22] Filed: Jan. 12, 1994

[30] Foreign Application Priority Data

Jan. 15, 1993 [SE] Sweden ................. 9300119

[51] Int. Cl.$^6$ ............................. C04B 35/81
[52] U.S. Cl. ........................ 501/89; 501/92; 501/95; 501/97; 501/127; 51/307
[58] Field of Search ............ 501/89, 92, 95, 97, 501/127, 128; 51/307, 309

[56] References Cited

U.S. PATENT DOCUMENTS

| | | |
|---|---|---|
| 4,320,203 | 3/1982 | Brandt . |
| 4,507,224 | 3/1985 | Tobiana et al. . |
| 5,059,564 | 10/1991 | Mehrotra et al. ............ 501/95 X |
| 5,123,935 | 6/1992 | Kanamaru et al. . |
| 5,177,037 | 1/1993 | Schuldies ..................... 501/95 X |
| 5,250,477 | 10/1993 | Baldoni, II et al. ........... 501/97 X |

FOREIGN PATENT DOCUMENTS 1-308881 12/1989 Japan .

OTHER PUBLICATIONS

T. N. Tiegs and P. F. Belcher, "Thermal Shock Behavior of an Alumina–SiC Whisker Composite", *J. Am. Ceram. Soc.*, 70 [5] C–109–C–11, May 1987.

*Primary Examiner*—Karl Group
*Attorney, Agent, or Firm*—Burns, Doane, Swecker & Mathis

[57] ABSTRACT

There is now provided a ceramic cutting tool material comprising a ceramic, preferably aluminum oxide based, matrix with 5–50%, preferably 10–40%, by volume of homogeneously dispersed SiC-whiskers and 1–20%, preferably 3–8%, by volume of particulate additions with a size <500 nm, preferably <200 nm, based upon carbides and/or nitrides and/or borides of metals from group VB (V,Nb,Ta) in the periodic system or solid solutions thereof. The nanosize particulate additions are predominantly present inside the matrix grains and not in the grain boundaries.

17 Claims, No Drawings

SIC WHISKER AND PARTICLE REINFORCED CERAMIC CUTTING TOOL MATERIAL

BACKGROUND OF THE INVENTION

The present invention relates to ceramic cutting tool materials and particularly to such cutting tool materials with a ceramic matrix in which monocrystalline whiskers (hair crystals) of silicon carbide and small (significantly less than 1 $\mu$m) particles of carbides, nitrides and/or borides of metals from group VB (V,Nb,Ta) are uniformly distributed resulting in an increased strength and toughness without negatively influencing the wear resistance of the material.

Ceramic cutting tool materials have been available for several decades. However, until recently they have not had any significant commercial importance for use in chipforming machining. The main reason for the limited growth of ceramic cutting tools has been sudden and unexpected tool failures because of their inherent inadequate strength and toughness.

In recent years, the properties of ceramic cutting tool materials have been improved in many respects and their use in cutting of cast iron and heat-resistant alloys (e.g., nickel-base alloys) has relatively increased.

Aluminum oxide based cutting tool materials are very sensitive to thermal crack formation because aluminum oxide in itself has a relatively poor thermal conductivity. This leads to very short tool lives in machining steel, particularly under conditions with short operating times and varying cutting depth.

To a certain extent, the thermal properties have been improved by particulate additions of titanium carbide and/or titanium nitride which enhance the thermal conductivity of the tool material. The addition of titanium carbide/nitride also increases the hardness of the material. In comparison with pure aluminum oxide materials, an increased tool life is therefore obtained in the cutting of harder work piece materials and in operations demanding thermal shock resistance. However, this kind of material has too poor a toughness behavior for a more general use in the cutting of steel.

A later development relates to alloying of uniformly dispersed fine-grained zirconium oxide particles in a matrix of aluminum oxide. A transformation of the 'metastable' zirconium oxide particles during use increases both strength and toughness and thus leads to a more predictable tool life.

The thermal properties of said type of materials are, however, only slightly better than those of pure aluminum oxide materials. Therefore, initiation and growth of thermally induced cracks is still a great problem in practical cutting operations generating high cutting edge temperatures such as cutting of steel.

It has recently been shown (T. N. Tiegs and P. F. Becher, J. Am. Ceram. Soc. 90(5) C-109-C-111, 1987) that alloying of SiC-whiskers, with mono-crystalline hair crystals, in a matrix of aluminum oxide leads to a greatly improved fracture toughness and strength. Ceramic cutting tool materials based upon said concept have shown very good performance in the cutting of heat-resistant materials in particular.

It is well-known that particulate additions can be used to improve the properties of a brittle ceramic material, e.g., U.S. Pat. No. 4,320,203 which relates to additions of TiN and Ti(C,N).

Depending on the nature of the additions the operating toughening mechanisms can be crack deflection, microcracking, transformation toughening or crack bridging. It is characteristic for these particulate additions that the size of the particles are of the same order of magnitude as the matrix material e.g., in the order of 1–5 $\mu$m and that they are located in the grain boundaries of the matrix material. Only in the case of $ZrO_2$-additions is a smaller grain size than the matrix needed in order to suppress a transformation during fabrication of the material. However, the zirconia particles are still predominantly located in the grain boundaries of the alumina matrix material.

It is also characteristic for the particulate reinforced materials that property improvements are achieved up to rather high particulate contents, normally up to 15–30 percent by volume.

It has recently been found that further improvements of the properties are possible in the silicon carbide whisker-reinforced cutting tool materials, especially the strength, if small additions of nanosize particles are added to the whisker reinforced materials. In U.S. Pat. No. 5,123,935 such a material is described containing nanosize Ti-compounds. It is believed that the function of the small Ti-compounds is to strengthen the alumina matrix and to refine the microstructure.

OBJECTS AND SUMMARY OF THE INVENTION

It is an object of this invention to avoid or alleviate the problems of the prior art.

It is thus an object of this invention to obtain a ceramic material for chipforming machining, particularly of steel, in which the above-mentioned weaknesses of today's known aluminum oxide-based cutting tool materials have been eliminated.

In one aspect of the invention there is provided a ceramic cutting tool material comprising a ceramic matrix with 5–50% by volume of homogeneously dispersed SiC-whiskers and 1–20% by volume of particulate additions with a size <500 nm based upon carbides and/or nitrides and/or borides of metals from group VB (V,Nb,Ta) of the periodic system or solid solutions thereof, said particulate additions being predominantly located inside the matrix grains and not in the grain boundaries.

DETAILED DESCRIPTION OF THE PREFERRED EMBODIMENTS OF THE INVENTION

It has now surprisingly been found that further improvements in whisker-reinforced ceramic cutting tool materials are possible if the added nanosized particles have a much lower thermal expansion coefficient than the matrix material i.e., alumina.

The thermal expansion coefficient for alumina is 8.4 $10^{-6}$ $K^{-1}$ (300–1300K). Reported values for TiC (7.4–8.6) are slightly lower than for alumina and reported values for TiN (8.0–9.3) slightly higher.

If small nanoparticles with much lower thermal expansion coefficients like TaN (5.0), TaC (4–6.5) and $TaB_2$ (5.5) are added, higher strengths are obtained which is believed to be caused by a more effective grain refinement. This could be caused by the fairly large internal stresses that are created within the alumina grains upon cooling from the sintering temperature. The internal stresses themselves can also have a strengthening effect due to interaction with an external stress field. The nanoparticles are predominantly (e.g., at least 55%, preferably at least 75%) located inside the matrix grains and not in the grain boundaries.

The ceramic cutting tool material according to the present invention comprises an oxide-based, preferably aluminum oxide based, matrix with 10-50%, preferably 20-40%, by volume of homogeneously dispersed whiskers based upon silicon carbide and 1-40%, preferably 1-25%, most preferably 3-8%, by volume of particulate additions with a size<500 nm, preferably <200 nm, based upon carbides, nitrides and/or borides of metals from group VB (V,Nb,Ta) preferably TaC, TaN, NbC, HfC, HfN or VC or solid solutions thereof. The whiskers should be monocrystals with a diameter of 0.5-10 μm and a length of 2.5-100 μm with a length/diameter ratio preferably of 5-10. The whiskers may at least partly be replaced by monocrystal platelets with a diameter of 5-20 μm and a thickness of 0.5-4 μm. The matrix is ceramic oxides, preferably alumina, or ceramic oxides mixed with hard carbides and/or nitrides and/or borides and/or binder metal. The grain size of the matrix shall be <10 μm, preferably <4 μm.

The nanosize compounds may contain oxygen up to 5 weight % and may be stoichiometric as well as nonstoichiometric.

The material may further contain zirconium oxide particles up to 20 weight %, which may further increase strength and fracture toughness.

The invention has been described with reference to an oxide based matrix. However, the same favorable results may also be obtained for a nitride-based matrix such as $Si_3N_4$.

The cutting material according to the invention is made by wet milling and mixing of matrix powder, nanosize powder, whisker and/or platelets and conventional sintering aids. After drying, the mixture is pressed to desired geometrical form and sintered to near theoretical density. After sintering, the possible remaining porosity can be further reduced using hot isostatic pressing. If it is not possible to obtain a closed porosity by pressureless sintering, the material can be pressure sintered with a suitable graphite tool or after encapsulation be hot isostatically pressed to desired density. The sintering conditions depend upon the raw-material in accordance with the knowledge of the skilled artisan and is chosen so that the material reaches a density which exceeds 98%, preferably 99.5% of theoretical density.

The invention is additionally illustrated in connection with the following Examples which are to be considered as illustrative of the present invention. It should be understood, however, that the invention is not limited to the specific details of the Examples.

EXAMPLE

Alumina powder, with a grain size of 0.6 μm, is mixed with 25 weight % (which corresponds to 30 volume %) silicon carbide whiskers with a diameter of 0.6 μm. Small (200 nm) particles of TiN and TaN are added in an amount of 5 volume %. In one experiment, a further addition of zirconia is made together with TaN additions. All materials are hot-pressed at 1840° C. at 28 MPa for one hour. Small test bars are cut from the hot pressed disc in order to evaluate the transverse rupture strength (TRS) in three-point bending test. The test bars are polished before testing.

Fracture toughness ($K_{1c}$) is also evaluated by means of a conventional indentation method. In said method, an indentation is made by means of a pyramid diamond tip and fracture toughness is calculated from the size of the cracks produced from the corners of the indentation.

Strength and fracture toughness values are given in Table 1.

TABLE 1

|  | TRS (MPa) | $K_{1c}$ MPam$^{\frac{1}{2}}$ |
| --- | --- | --- |
| 1. $Al_2O_3$ + 25 weight % SiC-whiskers | 850 | 6.8 |
| 2. $Al_2O_3$ + 25 weight % SiC-whiskers + 5 volume % TiN | 900 | 6.9 |
| 3. $Al_2O_3$ + 25 weight % SiC-whiskers + 5 volume % TaN | 1100 | 7.1 |
| 4. $Al_2O_3$ + 25 weight % SiC-whiskers + 5 volume % TaN + 10 weight % $ZrO_2$ | 1045 | 7.4 |

From Table 1, it is evident that already small additions of nanosize particles give significant strengthening but fracture toughness is not very much affected. Increased strength means that the risk of tool failure due to overloading of the insert is decreased and consequently the reliability is improved.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A ceramic cutting tool material comprising a ceramic matrix with 5-50% by volume of homogeneously dispersed SiC-whiskers and 1-20% by volume of particulate additions with a size <500 nm based upon carbides and/or nitrides and/or borides of metals from group VB (V,Nb,Ta) of the periodic system or solid solutions thereof, said particulate additions being predominantly located inside the matrix grains and not in the grain boundaries.

2. The ceramic cutting tool material of claim 1 wherein the ceramic matrix comprises aluminum oxide.

3. The ceramic cutting tool material of claim 1 wherein the ceramic matrix comprises $Si_3N_4$.

4. The ceramic cutting tool material of claim 1 wherein the material contains 10-40% by volume of said whiskers.

5. The ceramic cutting tool material of claim 1 wherein the material contains 3-8% by volume of said particulate additions.

6. The ceramic cutting tool material of claim 1 wherein the material contains said particulate additions with a size <200 nm.

7. The ceramic cutting tool material of claim 1 wherein the particulate additions have a lower coefficient of thermal expansion than the ceramic matrix.

8. The ceramic cutting tool material of claim 1 wherein the particulate additions are selected from the group consisting of TaC, TaN, NbC, VC and solid solution mixtures thereof.

9. The ceramic cutting tool material of claim 1 wherein at least 55% of the particulate additions are present inside the matrix grains.

10. The ceramic cutting tool material of claim 1 wherein at least 75% of the particulate additions are present inside the matrix grains.

11. The ceramic cutting tool material of claim 1 wherein the SiC-whiskers have a diameter of 0.5–10 μm, a length of 2.5–100 μm and a length/diameter ratio of 5–10.

12. The ceramic cutting tool material of claim 1 further comprising monocrystal SiC platelets partly replacing the SiC-whiskers.

13. The ceramic cutting tool material of claim 1 further comprising monocrystal SiC platelets partly replacing the SiC-whiskers, the platelets having a diameter of 5–20 μm and a thickness of 0.5–4 μm.

14. The ceramic cutting tool material of claim 1 wherein the ceramic matrix has a grain size of <10 μm.

15. The ceramic cutting tool material of claim 1 wherein the ceramic matrix has a grain size of <4 μm.

16. The ceramic cutting tool material of claim 1 further comprising up to 20 wt. % of zirconium oxide particles.

17. The ceramic cutting tool material of claim 1 wherein the ceramic matrix is a ceramic oxide matrix.

* * * * *